United States Patent [19]
Tanaka et al.

[11] Patent Number: 5,993,723
[45] Date of Patent: Nov. 30, 1999

[54] INJECTION COMPRESSION MOLDING METHOD

[75] Inventors: Yuji Tanaka; Masahito Kuramitsu; Nobuyoshi Umeniwa; Yoshimasa Matsuura, all of Kanagawa, Japan

[73] Assignee: Asahi Kasei Kogyo Kabushiki Kaisha, Osaka, Japan

[21] Appl. No.: 08/925,714

[22] Filed: Sep. 9, 1997

[30] Foreign Application Priority Data

Sep. 10, 1996 [JP] Japan .................... 8-238282

[51] Int. Cl.[6] .................................................. B29C 45/00
[52] U.S. Cl. .................................................... 264/500
[58] Field of Search .............................. 264/500, 572

[56] References Cited

U.S. PATENT DOCUMENTS 5,090,886  2/1992  Jaroschek ................. 264/572
5,277,865  1/1994  Hara et al. ................ 264/572

FOREIGN PATENT DOCUMENTS

| 4-284213 | 10/1992 | Japan . |
| 5-293844 | 11/1993 | Japan ................. 264/572 |
| 6-122129 | 5/1994 | Japan ................. 264/572 |
| A-7-314484 | 12/1995 | Japan . |
| 8-267493 | 10/1996 | Japan ................. 264/572 |

*Primary Examiner*—Catherine Timm
*Attorney, Agent, or Firm*—Birch, Stewart, Kolasch & Birch, LLP

[57] ABSTRACT

An injection compression molding method is characterized in that a resin is injected from a resin gate provided near a recess portion of a mold corresponding to a thick rib portion, gas is injected from the thick rib portion before the mold is closed and compressed, and thereafter the resin is made to flow back from the resin gate to an injection nozzle while the mold is closed and compressed.

5 Claims, 7 Drawing Sheets

# INJECTION COMPRESSION MOLDING METHOD

BACKGROUND OF THE INVENTION

1. Field of the Invention

The present invention relates to an injection compression molding method of a molded article having a thick rib portion, and more particularly to an injection compressing molding method using both clamping force and gas pressure.

2. Description of the Related Art

Conventionally, there has been widely known a gas injection molding method in which gas is injected into a thick portion of the molded article to make it hollow in order to improve sinkages in the molded article.

In such a gas injection molding method, it is necessary to charge molten resin into a mold cavity at an extremely low pressure in order to inject gas into the molten resin. As a result, the transferability of the mold is deteriorated, and the appearance of the molded article is apt to be spoiled, so that fabricating such as painting or the like is required as occasion demands. In addition, is has been found that technical investigations including many things such as the arrangement of the thick portion, the size, the arrangement of the gate, and so on, are necessary for making a desired thick portion hollow. In addition, the gas pressure to be used is generally high, and consumption of the gas is also high, thereby causing increase in production cost. Further, when treatment such as plating, etc., is required, a plating solution is apt to invade the hollow portion from the hole of the gas injection port to generate a defect product. Therefore, troublesomely, a pre-process for sealing the hole of the gas injection port is required.

As an injection molding method for solving the problems with the aforementioned gas injection molding method, there is an injection compression molding method using both clamping force and gas pressure. For example, a method in which molten resin is injected in a state where a mold has not been closed perfectly yet, and gas is injected between the resin of a thick portion and the mold after the molten resin reaches the thick portion by clamping compression of the mold.

Such an injection compression molding method using both clamping force and gas pressure is regarded as effective on molding a molded article having a thick portion locally, such as a boss, etc. That is, sinkages are apt to be produced in the thick portion and spoil its appearance when such a molded article is molded by a usual injection molding method. On the other hand, in the above-mentioned injection compression molding method using both the clamping force and gas pressures, there is not such a problem and sinkages are prevented from being produced, and a molded article with a superior appearance can be obtained easily.

However, the above-mentioned conventional injection compression molding method using both the clamping force and gas pressures suffers from the following problems.

When gas is injected while clamping pressure is maintained after completion of mold clamping, it is indeed possible to make the gas pressure act directly on a locally thick portion such as a boss, etc. easily, but it is difficult to make the gas pressure act sufficiently all over a continuously thick portion such as a rib, etc., because of an increase in the pressure of molten resin in the mold caused by the clamping pressure being maintained. Therefore, when a continuously thick portion such as a rib, etc. is formed, it is necessary to increase the gas pressure or provide a number of gas injection ports. As a result, the design of the thick portion is inevitably limited for the sake of gas injection, and the level of sinkages in the obtained molded article cannot be satisfactory.

SUMMARY OF THE INVENTION

The present invention has been made to solve the foregoing problems with conventional injection compression molding methods using both clamping force and gas pressure. An object of the present invention is to provide an injection compression molding method which is easily applicable also to a design in which a thick portion is set in a large region at a low gas pressure, and which can mold a molded article stably with a thick portion having no sinkage and a superior appearance.

To attain the above object, according to a first aspect of the present invention, there is provided an injection compression molding method in which molten resin is injected into a cavity in a state where a mold is not closed perfectly, the mold is closed and compressed, and the molten resin is developed so as to form a molded article having a thick rib, the method comprising the steps of: providing a resin gate near a thick rib portion and injecting resin from the resin gate; injecting gas from the thick rib portion to make the gas flow between resin of the thick rib portion and the mold before closing and compressing the mold; thereafter making the resin flow back from the resin gate while closing and compressing the mold; and making the gas further flow near the thick rib portion.

Also, according to a second injection compression molding method of the present invention, there is provided an injection compression molding method in which molten resin is injected into a cavity in a state where a mold is not closed perfectly, the mold is closed and compressed, and the molten resin is developed so as to form a molded article having a thick rib 11, the method comprising the steps of: providing a resin gate near a thick rib portion and injecting resin from the resin gate; succeedingly making the resin flow back from the resin gate while closing and compressing the mold; at the same time or thereafter injecting gas from the thick rib portion to make the gas flow near the thick rib portion.

The injection compression molding method using gas pressure together with the clamping force according to the present invention further comprises the steps of: using a mold in which a gas injection port is disposed approximately in opposition to the resin gate; and lowering compression pressure immediately after completion of closure and compression of the mold.

The above and other objects and features of the present invention will be more apparent from the following description taken in conjunction with the accompanying drawings.

DETAILED DESCRIPTION OF THE PREFERRED EMBODIMENTS

Now, a description will be given in more detail of preferred embodiments of the present invention with reference to the accompanying drawings.

Figure 1:
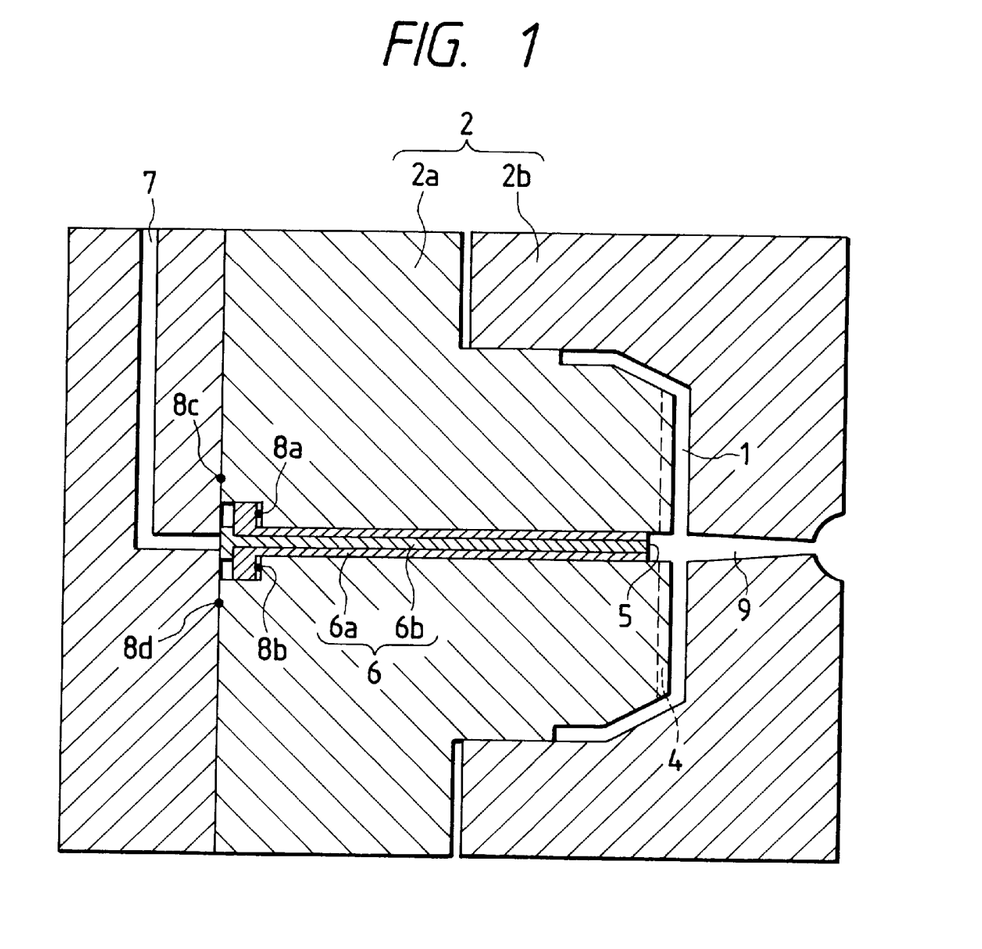
FIG. 1 is a sectional view illustrating an example of a mold used for the present invention.

FIG. 1 is a model diagram illustrating an example of a mold used in an embodiment of the present invention. In the method of the present invention, a mold in which a cavity 1 is not opened even though the mold is slightly or half-opened as shown in FIG. 1 is used to inject molten resin in the state where the mold is not closed perfectly (or is slightly or half-opened).

Figure 2A:
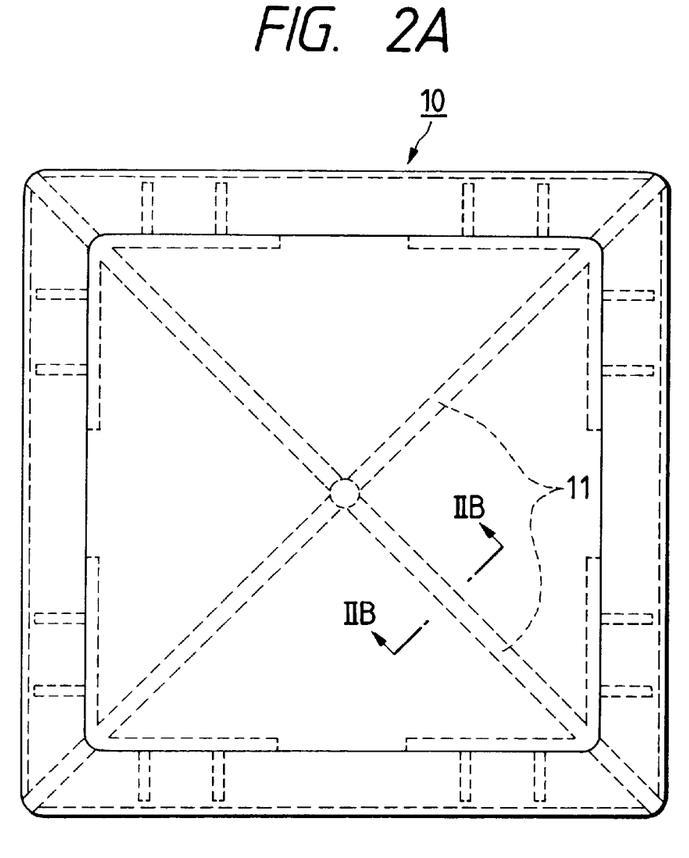
FIG. 2A is a top view illustrating an example of a molded article to be molded according to the present invention.
Figure 2B:
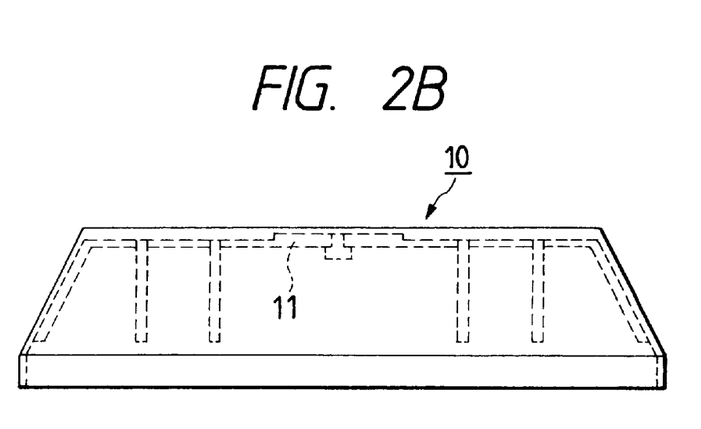
FIG. 2B is a cross-sectional view taken along a line IIB—IIB of FIG. 2A.

The cavity 1 is designed to mold a molded article 10 shaped as shown in FIGS. 2A and 2B, in which one end side in the open, close direction of the mold 2 is opened while the other end side in the open, close direction of the mold 2 and its circumference are enclosed, such as a package box, a housing of an electric equipment, a door of a cabinet or the like, a toiletry dressing table, further an exterior part including a wheel cap, a bumper, a spoiler and so on, an interior part including an instrument panel, a lining of a door, pillars, and so on, in a car.

The mold 2 will be described in more detail. The cavity 1 is formed between a movable mold 2a and a fixed mold 2b as shown in FIG. 1. Although the movable mold 2a is a core mold and the fixed mold 2b is a cavity mold in the drawings, there is no problem even if the fixed mold 2b is a core mold and the movable mold 2a is a cavity mold.

A recess portion 4 corresponding to a thick rib portion 11 of the molded article is formed on the side of the movable mold 2a. On the side of the fixed mold 2b, a resin gate 9 is provided near the recess portion 4. In addition, an ejector pin 6 penetrating the movable mold 2a is provided on the side of the movable mold 2a so that the forward end face of the ejector pin 6 is made to face the cavity 1 at the position where the ejector pin 6 intersects the recess portion 4. The ejector pin 6 is constituted by a pipe sleeve 6a and a shaft pin 6b inserted into this sleeve 6a. A gap as a path of pressurized gas, which will be described later, is left between the sleeve 6a and the shaft pin 6b. The rear end of the ejector pin 6 contacts with a pressurized gas path 7. The position of the ejector pin 6 can be established desirably so long as its forward end face is opposite to the recess portion 4.

Pressurized gas supplied through the pressurized gas path 7 passes the gap between the sleeve 6a and the shaft pin 6b from the rear end of the ejector pin 6, fed into the cavity 1 from the gas injection port 5 in the front end portion of the ejector pin 6. The reference numerals 8a to 8d represent sealing materials.

An example in which the molded article 10 shown in FIGS. 2A and 2B is molded by using the mold 2 having the structure shown in FIG. 1 will be described specifically with reference to FIGS. 3A to 3C as an injection compression molding method according to a first embodiment of the present invention. The ejector pin 6 is illustrated briefly in FIGS. 3A to 3C.

Figure 3A:
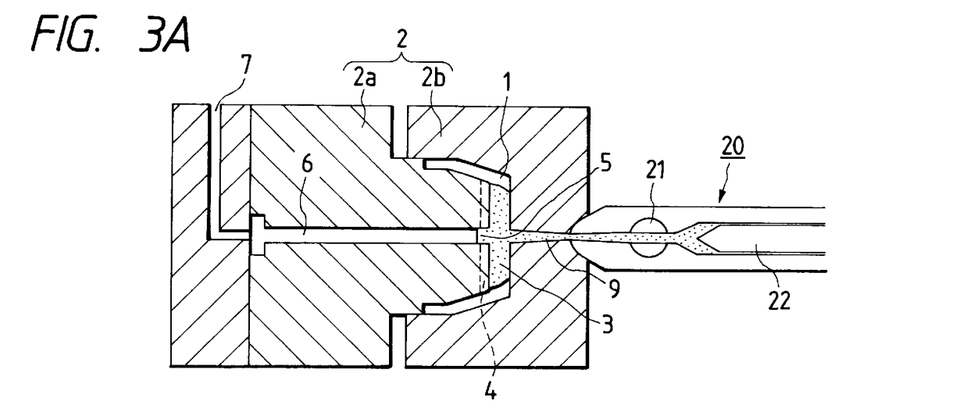
FIGS. 3A to 3C are diagrams for explaining an injection compression molding method according to a first embodiment of the present invention.

First, molten resin 3 is injected into the cavity 1 from the resin gate 9 by an injection nozzle 20 in the state where the mold 2 is opened slightly as shown in FIG. 3A. As the resin, thermoplastic resin used in a general injection molding method or a general extrusion molding method can be used widely. In addition, thermosetting resin may also be used in accordance with necessity. Further, bulking agents such as fillers, reinforcing fibers, etc., or various additives (such as plasticizers, lubricants, ultraviolet light absorber, dyes, pigments, anti-fog additives, antistatic additives, flame retarders, etc.) may be added to these resins.

Figure 3B:
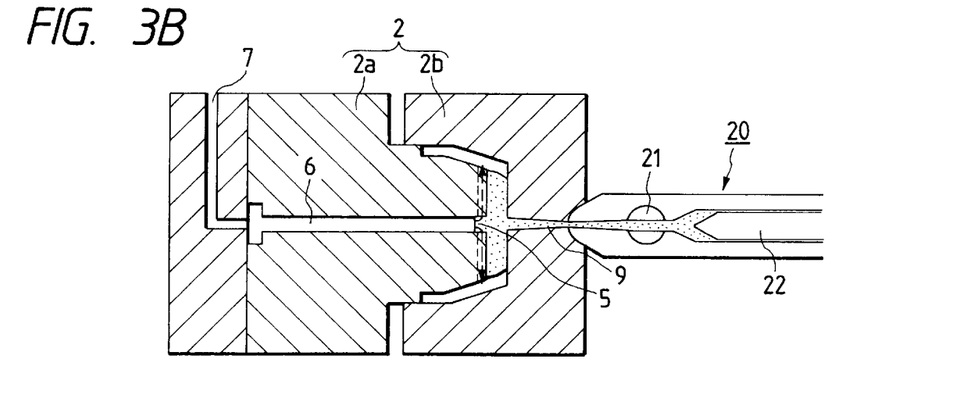

Next, the pressurized gas is injected into the cavity 1 from the gas injection port 5, as shown in FIG. 3B. As the gas, inert gas such as nitrogen gas or the like, air, etc., can be used. Inert gas such as nitrogen gas or the like is preferable to prevent gas yellowing or the like. In addition, since an satisfactory molded article can be molded with low pressure gas (e.g. 60 kg/cm$^2$ or less) in the molding method according to the present invention, there is no problem even if the air is used. In this case, it is easy to produce the compressed gas and a supplying apparatus, so that molding can be attained at a cost lower than the case where nitrogen gas or the like is used.

Special control is not necessary to inject the gas, and the gas may be always injected. In addition, when the gas injection timing and duration are controlled by using an injection start signal, a mold clamping start signal, etc. from a molder, it is more effective in view of the gas consumption.

Injecting the compressed gas is not limited to the way which is carried out through the ejector pin 6, and it may be carried out by forming a path of the compressed gas formed in the mold 2 separately. For example, the gas may be supplied by using a gas supply equipment used in a gas injection molding method.

Figure 3C:
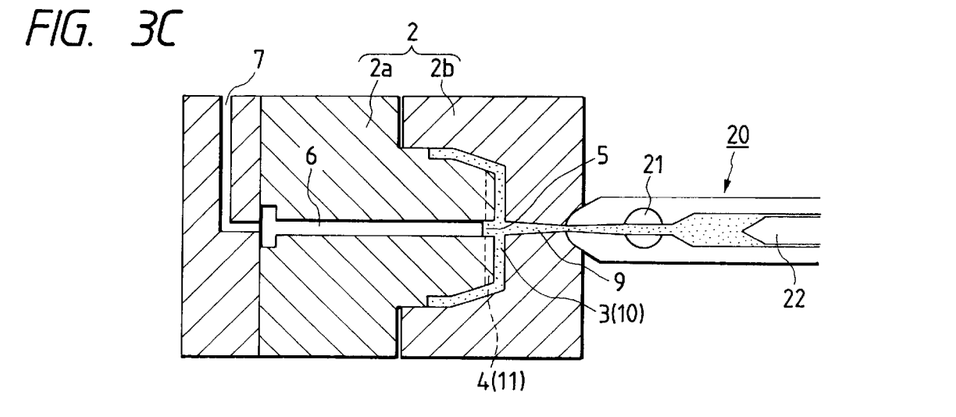

Next, the resin in the cavity 1 is made to flow back from the resin gate 9 while the mold 2 is closed and compressed, as shown in FIG. 3C. Specifically, the mold 2 is closed and compressed while a nozzle gate 21 of the injection nozzle 20 is left open, with the result that the resin can be made to flow back into the injection nozzle 20 from the resin gate 9. Besides, after completion of injection of the molten resin, the nozzle gate 21 may be once closed, and the mold 2 be closed and compressed to develop the resin in the cavity 1. In this case, when the nozzle gate 21 is thereafter opened again while the mold 2 is kept closed and compressed, the resin can be also made to flow back into the injection nozzle 20. In either case, an injection screw 22 retreats when the resin flows back.

Such retreat of the injection screw 22 may be also performed forcibly in the timing in synchronism with closure and compression of the mold 2. Specifically, when the mold 2 is closed and compressed or the mold clamping pressure is increased, the injection screw 22 can be controlled to retreat by a preset quantity, for example, by use of a start signal designating the closing and compression of the mold 2, or the mold clamping force or the mold open quantity is detected so that the injection screw 22 can be controlled to retreat by used of this detection signal.

After completion of the closure and compression of the mold 2, the mold 2 is kept for a predetermined time as it is. After the molded article 10 is cooled, the mold 2 is opened, and the molded article 10 is extracted.

Next, an example in which the molded article 10 shown in FIG. 2 is molded by using the mold 2 having the structure shown in FIG. 1 in the same manner as in the above embodiment will be specifically described with reference to FIGS. 4A and 4B as an injection compression molding method according to a second embodiment of the present invention. The ejector pin 6 is illustrated briefly also in FIGS. 4A and 4B.

Figure 4A:
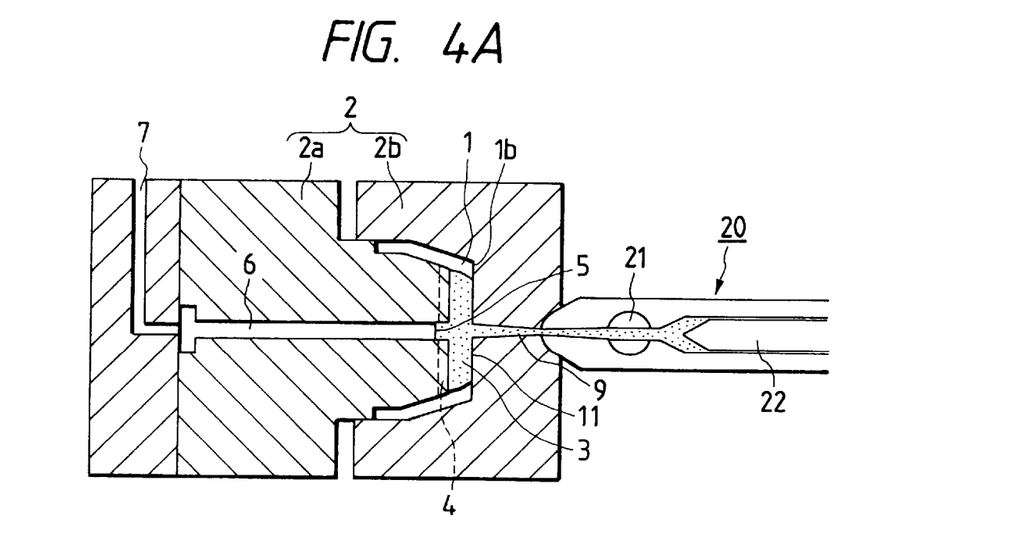
FIGS. 4A and 4B are diagrams for explaining an injection compression molding method according to a second embodiment of the present invention.

First, the above-mentioned molten resin 3 is injected into the cavity 1 from the resin gate 9 by the injection nozzle 20 in the state where the mold 2 is opened slightly as shown in FIG. 4A.

Figure 4B:
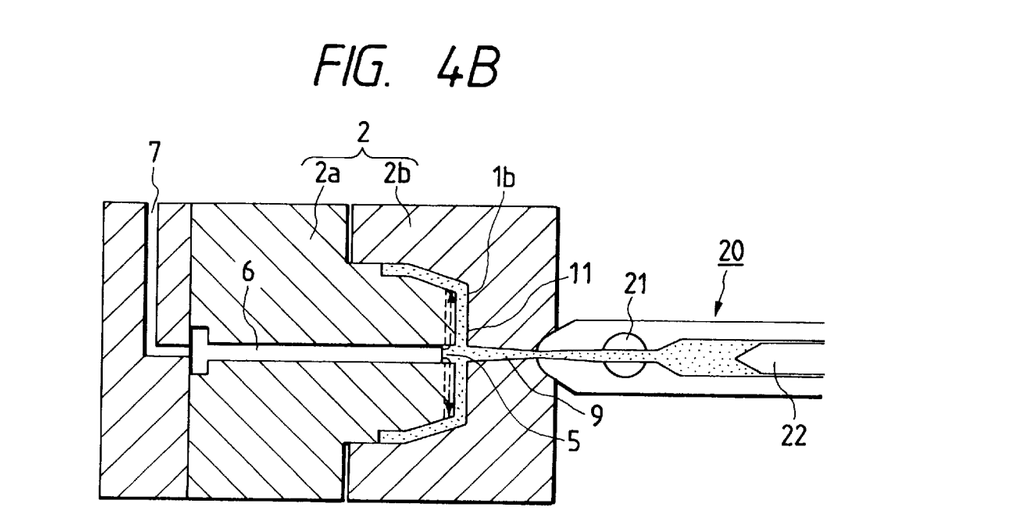

Next, the resin in the cavity 1 is made to flow back from the resin gate 9 while the mold 2 is closed and compressed, as shown in FIG. 4B. In addition, the above-mentioned compressed gas is injected into the cavity 1 from the gas injection port 5 at the same time as or after the closure and compression of the mold 2. The injection screw 22 retreats when the resin flows back, in the same manner as in the injection compression molding method according to the first embodiment of the present invention.

According to the injection compression molding method of the present invention, the resin flows back from the resin gate 9 provided near the thick rib portion 11 when the mold 2 is closed and compressed, with the result that there arises an action to reduce the resin pressure of the thick rib portion 11 extremely effectively. Accordingly, it is possible to introduce gas to the circumference of the thick rib portion 11 surely without increasing the gas pressure excessively.

That is, in the injection compression molding method according to the first embodiment of the present invention, gas injected before the mold 2 is closed and compressed is made to flow between the core mold 2a and the molten resin 3 to some extent, and thereafter introduced preferentially to the circumference of the thick rib portion 11 cooled later than a normal thick portion (thin portion) and having a high flowability when the mold 2 is closed and compressed. In addition, in the injection compression molding method according to the second embodiment of the present invention, gas injected after the mold 2 is closed and compressed is thereafter introduced preferentially to the circumference of the thick rib portion 11 when the mold 2 is closed and compressed, in the same manner as mentioned above. Accordingly, it is possible to press the thick rib portion 11 selectively, so that it is possible to increase the pressing effect of the gas. The gas pressure varies in accordance with the gas flow, the slight-opening of the mold 2, and the resin pressure of the gas injection port 5 based on the quantity of the charged resin in those conditions, however, the gas pressure may be 60 kg/cm² or less, and normally it is satisfactory if the gas pressure is about 5 to 40 kg/cm².

In addition, according to the injection compression molding method of the present invention, the compression region can be increased with the flow back of the resin when the mold 2 is closed and compressed, so that the resin pressure in the cavity can be made uniform. Therefore, particularly when a box-like molded article as shown in FIG. 2 is molded, it is possible to make compression pressure act on the end portions (side portions of the box-like shape) of the molded article sufficiently.

Figure 5A:
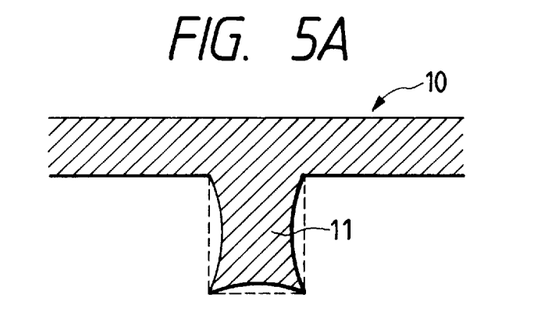
FIGS. 5A and 5B are sectional views illustrating an example of the shape of a thick portion of a molded article to be molded according to the present invention.
Figure 5B:
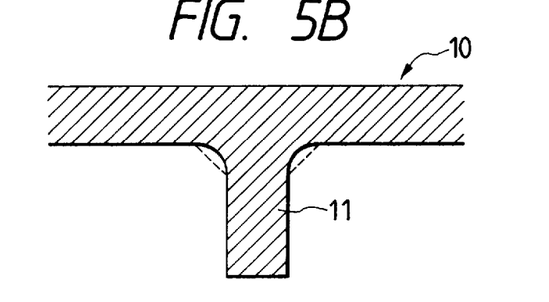

The molded article obtained by the injection compression molding method according to the present invention does not reflect the shape of the cavity 1 just as it is because the thick rib portion 11 is pressed by gas. That is, the thick rib portion 11 of the molded article 10 in FIG. 2 has an A—A section, for example, as shown in FIG. 5A or 5B. The dotted line in FIGS. 5A and 5B designates a cavity face, and the space between the cavity face and the thick rib portion 11 is a space where the gas is enclosed or flowing. The final shape of the thick rib portion 11 depends on the shape of the cavity corresponding to the thick rib portion 11, the quantity of the charged resin, the quantity and pressure of the enclosed gas, and so on. However, there is no fear that the appearance of the molded article is damaged, because a thick portion such as a rib, a boss or the like is formed on the back of the molded article.

In the injection compression molding method according to the present invention, a normal thick portion is not pressed by gas directly but the normal face (opposite to the thick rib portion 11) is compressed by a mechanical press, and only the thick rib portion 11 is pressed by the gas. Sinkages in the appearance are improved by such gas pressure onto such a thick portion.

In the injection compression molding method according to the present invention, gas is introduced selectively to the circumference of a thick portion cooled later and having a high flowability. Accordingly, the gas injection port 5 is provided in the position where the gas injection port 5 intersects the recess portion 4 corresponding to the thick portion of the molded article as shown in FIG. 1. In addition, it is particularly preferable to dispose the gas injection port 5 so as to be in opposition to the resin gate 9. Accordingly, the resin pressure in the portion of the gas injection port 5 can be reduced extremely effectively by the flow back of the resin when the mold 2 is closed and compressed, so that it is possible to advance introduction of the gas smoothly.

Figure 6A:
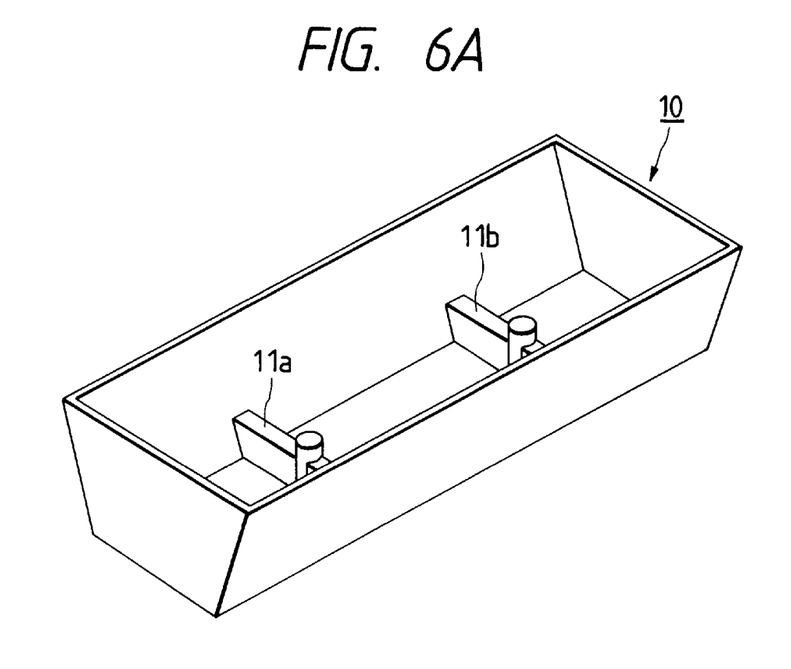
FIGS. 6A and 6B are diagrams illustrating another example of a molded article to be molded according to the present invention.

When a molded article 10 having a plurality of independent thick portions 11a and 11b as shown in FIG. 6A is molded, it is preferable to use a mold provided with a plurality of gas injection ports in the position where the respective thick portions intersect each other.

Figure 6B:
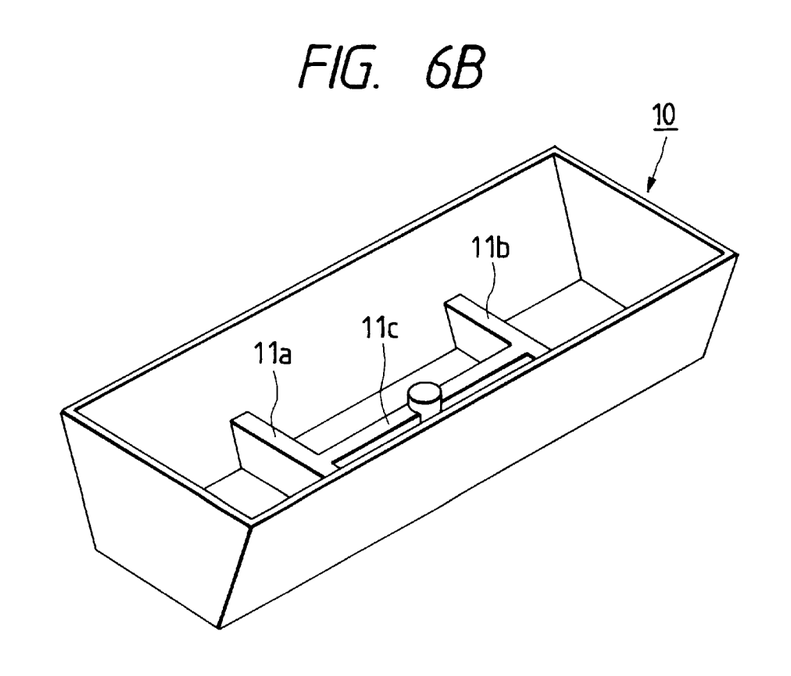

In addition, it is also preferable to provide a thick portion 11c coupling the thick portions 11a and 11b, and to make all the thick portions continuous, as shown in FIG. 6B. Consequently, it is possible to make gas pressure act on all the thick portions through one gas injection port. However, it is preferable to provide a plurality of gas injection ports when the total length of the thick portions is particularly long. In this case, other gates for making resin flow back may be provided separately in a position opposite to the respective injection ports, in addition to the resin gate 9 for injecting molten resin.

Further, in the injection compression molding method according to the present invention, it is preferable to lower compression pressure immediately after completion of closure and compression of the mold, that is, immediately after the established compression time is over or the movable side of the mold reaches an established compression completion position.

Finally, if the compression pressure is lowered, gas can be introduced also to a thick portion in the peripheral portion of the molded article away from the gas injection port 5 more surely. The compression pressure at that time may be established to be lower than mold clamping force when molten resin is injected and charged or pressing pressure when the mold is closed and compressed. Preferably, the relation of $P_1$ (kg/cm²)$\geq P_2$ (kg/cm²) is established between pressing pressure $P_1$ and gas pressure $P_2$.

According to the present invention, the surface condition of the molded article 10 particularly on the side where compressed gas is not pressed in, that is, the surface condition of the molded article 10 on the side which is pressed onto a cavity face 1b by the press-in of the compressed gas is improved. Accordingly, it is preferable that the compression gas is pressed onto the side of the molded article which is hardly seen when the article is used. For example, with respect to a housing of an electric equipment, it is preferable that the compression gas is pressed into the inner surface side.

Now, examples and comparatives will be described.

In each of Comparatives 1 to 2 and Examples 1 to 3 shown below, the molded article 10 shown in FIG. 2 was molded by using the mold 2 shown in FIG. 1.

An injection molder "IP.1050" made by KOMATSU Co., Ltd, in which a movable mold can be moved and held desirably during molding, was used as the molder. Mold clamping force, pressing pressure, pressing rate, and press start position can be set in this molder.

The resin gate 9 and the gas injection port 5 were disposed in opposition to each other in the mold 2. In the movable mold 2a, the recess portion 4 corresponding to the thick portion 11 of the molded article was formed to thereby intersect the gas injection port 5. The injection nozzle 20 shown, for example, in FIGS. 3A to 3C had a hot-runner and bubble-gate structure. The ejector pin 6 was formed by the combination of the stepped sleeve 6a of the inner diameter 2 mm and the outer diameter 4 mm, and the shaft pin 6b of the outer diameter 1.98 mm, and the clearance was not adjusted specifically. In addition, the forward end portion (injection port 5) of the ejector pin 6 was made flat relatively to the molded article.

In the molded article 10, the ceiling face was 250 mm×250 mm (the thickness of the ceiling face portion was freely set), and the height of the side faces was 80 mm (the draft angle of the side faces was 10 degrees). A rib (thick portion 11) 3 mm wide and 5 mm high was set radially in the back of the ceiling face.

Four kinds of resins, ABS (STYLUCK 191F), modified PPE (ZYLON 220Z), ABS-GF (STYLUCK R220A added with 10% GF), and HIPS (STYLON 408) were used, and the mold temperature was set to 70° C.

COMPARATIVE 1

Resin the amount of which was 98% of the weight of a usual injection molded article was injected in the state where a spacer was inserted between the movable mold side and the fixed mold side so as to fix the thickness of the ceiling face to 2 mm, and the mold was clamped perfectly by a mold clamping force of 300 tons. Nitrogen gas under the pressure 75 kg/cm$^2$ was pressed into the mold for 30 seconds immediately after completion of the injection. After completion of cooling, the mold was opened, and the molded article was taken out. The level of sinkages in the thus obtained molded article was improved in comparison with a usual injection molded article, but it did not reach a satisfactory level.

COMPARATIVE 2

After completion of the injection of molten resin with the mold being slightly opened (thickness of the ceiling face portion was 4 mm), the mold was closed and compressed immediately. Then, the quantity of the charged molten resin was adjusted to make the thickness of a final product 2 mm, and the compression pressure was made 150 kg/cm$^2$. Nitrogen gas under a pressure of 70 kg/cm$^2$ was pressed into the mold for 30 seconds immediately after completion of the compression. After completion of cooling, the mold was opened, and the molded article was extracted. The level of sinkages in the obtained molded article was improved in comparison with a usual injection molded article, but it did not reach a satisfactory level.

EXAMPLE 1

After completion of the injection of molten resin with the mold being slightly opened (thickness of the ceiling face portion was 4 mm), the mold was closed and compressed immediately, and at the same time, the injection screw was made to retreat by 9 mm. At this time, the quantity of the charged molten resin was adjusted to make the thickness of a final product 1.8 mm, and the compression pressure was made 150 kg/cm$^2$. Nitrogen gas under a pressure of 55 kg/cm$^2$ was pressed into the mold for 30 seconds immediately after completion of the compression. After completion of cooling, the mold was opened, and the molded article was extracted. The level of sinkages in the obtained molded article was much improved in comparison with Comparative 2.

EXAMPLE 2

Molding was performed in the same manner as in Example 1, except that the mold clamping pressure was lowered from 150 kg/cm$^2$ to 80 kg/cm$^2$ immediately after the thickness of the molded article reached 1.8 mm by the closure and compression of the mold, and further except that nitrogen gas was pressure pressed into the mold at a pressure of 35 kg/cm$^2$. The level of sinkages in the obtained molded article was improved in the same manner as in Example 1 in spite of the low gas pressure.

EXAMPLE 3

Molding was performed in the same manner as in Example 2, except that gas was pressed into the mold at the same time as injection of molten resin was started. The level of sinkages in the obtained molded article was improved in the same manner as in Example 1 in spite of the low gas pressure.

EXAMPLE 4

Figure 7:
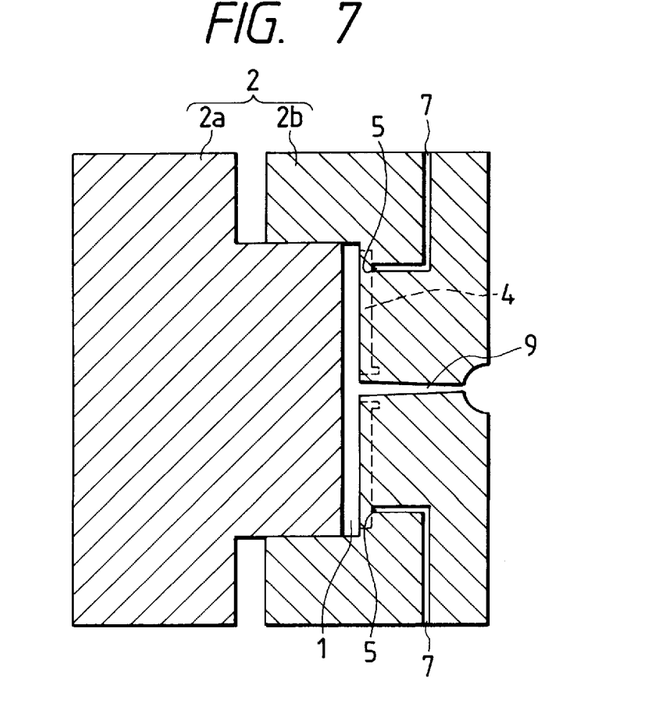
FIG. 7 is a sectional view illustrating a mold used in Example 4.
Figure 8A:
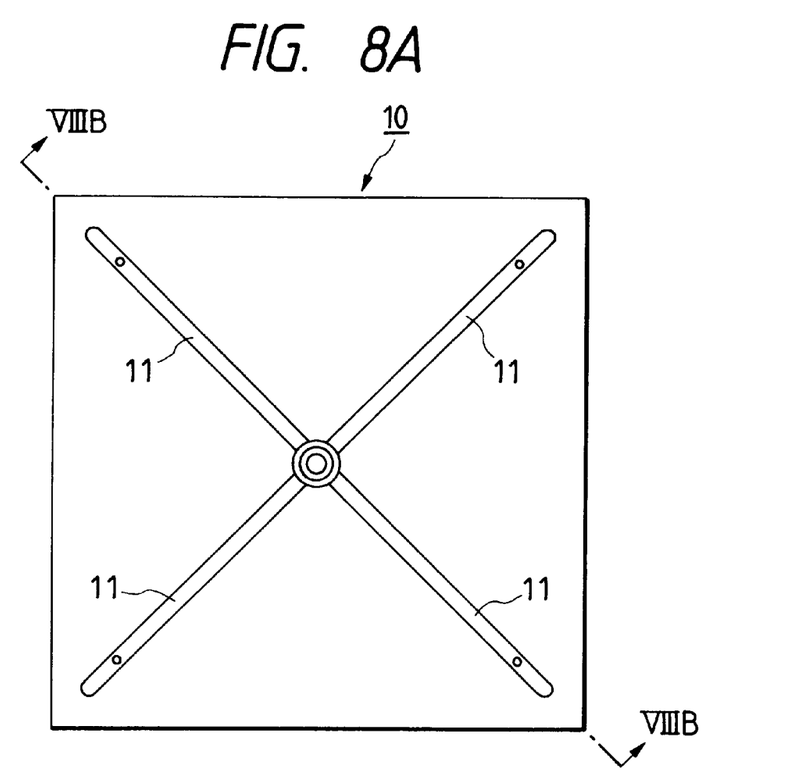
FIG. 8A is a rear view illustrating a molded article molded in Example 4.
Figure 8B:
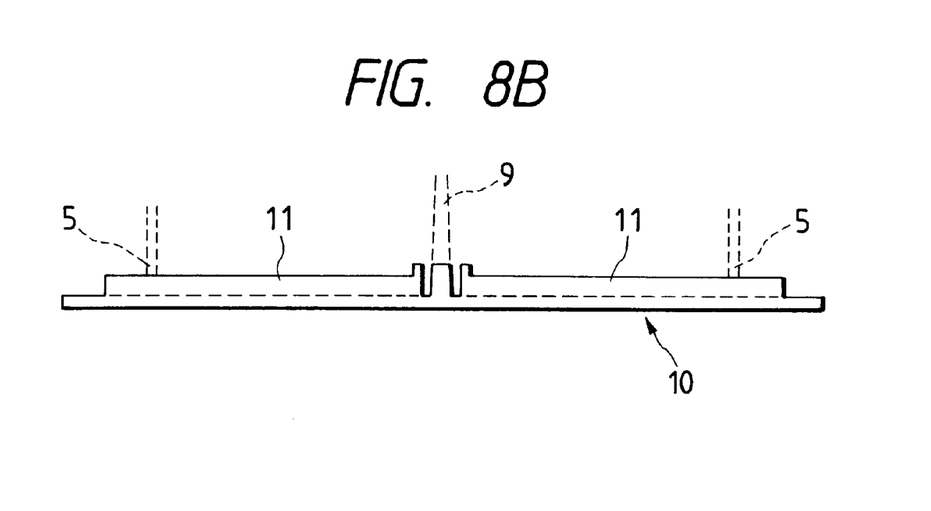
FIG. 8B is a cross-sectional view taken along a line VIIIB—VIIIB of FIG. 8A.

The molded article 10 shown in FIGS. 8A and 8B was molded in the same manner as in Example 3 by using the mold 2 in which the resin gate 9 and the gas injection port 5 were disposed on the same side (the side of the fixed mold 2b) as shown in FIG. 7. With respect to the molded article 10, the size was 250 mm×250 mm, and the thickness was 1.8 mm. In addition, a rib (thick portion 11) 3 mm wide and 5 mm high was provided in the back of the molded article 10.

The level of sinkages in the obtained molded article was improved in the same manner as in Example 1 in spite of low gas pressure.

Table 1 shows the results of measurement of sinkages and visual evaluation of appearance in the molded articles obtained according to the above Comparatives and Examples.

TABLE 1

|  | Measurement result of sinkages (μm) | Visual evaluation of appearance sinkages, flashing, etc. |
| --- | --- | --- |
| Comparative 1 | 10 | Bad |
| Comparative 2 | 7 | Bad |

TABLE 1-continued

|  | Measurement result of sinkages (μm) | Visual evaluation of appearance sinkages, flashing, etc. |
|---|---|---|
| Example 1 | 1 or less | Good |
| Example 2 | 1 or less | Good |
| Example 3 | 1 or less | Good |
| Example 4 | 1 or less | Good |

The present invention, which has been described above, has effects as follows.

(1) Resin flows back from a resin gate disposed near a thick rib portion when a mold is closed and compressed, with the result that the resin pressure of the thick rib portion can be reduced extremely effectively. Accordingly, it is possible to introduce gas to the circumference of the thick rib portion surely. Therefore, without sacrificing the resin extending effect in the compression molding method, the thick rib portion can be pressed selectively by use of low pressure gas, and it is therefore possible to improve the pressing effect of the gas.

(2) The compression region can be increased with the flow back of the resin when the mold is closed and compressed, so that the resin pressure in the cavity can be made uniform. Therefore, particularly when a box-like molded article is molded, it is possible to make the compression pressure act also on end portions of the molded article sufficiently.

(3) Therefore, the present invention is easily applicable to a design in which a thick portion is set in a large region at a low gas pressure, and it is possible to stably mold a molded article with a thick portion having no sinkage and a superior appearance.

The foregoing description of a preferred embodiment of the invention has been presented for purposes of illustration and description. It is not intended to be exhaustive or to limit the invention to the precise form disclosed, and modifications and variations are possible in light of the above teachings or may be acquired from practice of the invention. The embodiment was chosen and described in order to explain the principles of the invention and its practical application to enable one skilled in the art to utilize the invention in various embodiments and with various modifications as are suited to the particular use contemplated. It is intended that the scope of the invention be defined by the claims appended hereto, and their equivalents.

What is claimed is:

1. An injection compression molding method for forming a molded article having a thick rib, said method comprising the steps of:

providing a resin gate (9) connected to a cavity (1) in a mold (2), said cavity (1) including a thick rib portion (11) and said resin gate (9) located upstream from said thick rib portion (11);

injecting molten resin provided in an injection nozzle (20) from said resin gate (9) into said cavity (1) in a state where the mold (2) is not closed perfectly;

injecting gas from a gas injection port (5) located in said thick rib portion (11) into said cavity (1) to make said gas flow between said resin and said mold (2) in the vicinity of said thick rib portion (11) before the mold (2) is closed and compressed;

thereafter making said resin flow back to said injection nozzle (20) from said resin gate (9) while compressing said resin by perfectly closing said mold (2); and making said gas further flow in a periphery of said resin in said thick rib portion (11).

2. An injection compression molding method according to claim 1, wherein a gas injection port of said mold is disposed approximately in opposition to said resin gate.

3. An injection compression molding method according to claim 1, further comprising the steps of: lowering compression pressure immediately after completion of perfectly closing said mold.

4. An injection compression molding method according to claim 1, wherein a gas injection timing and duration are controlled by using an injection start signal, a mold clamping start signal.

5. An injection compression molding method according to claim 1, wherein a plurality of gas injection ports are provided in correspondence with a plurality of thick ribs of said molded article.

* * * * *